United States Patent [19]

Mateja

[11] 3,821,622

[45] June 28, 1974

[54] MOTOR CONTROL CIRCUIT FOR DUAL SPEED MAGNETICALLY STRIPED CARDS

[75] Inventor: Eugene V. Mateja, Norridge, Ill.

[73] Assignee: Bell & Howell Co., Chicago, Ill.

[22] Filed: Sept. 13, 1972

[21] Appl. No.: 288,619

[52] U.S. Cl....... 318/305, 179/100.2 S, 235/61.11 R

[51] Int. Cl......... G11b 5/80, G06k 7/06, H02p 7/06

[58] Field of Search........... 318/162, 563, 629, 305; 35/35 C; 179/100.2 S; 235/61.11 R, 61.12; 307/109; 320/1 X

[56] References Cited

UNITED STATES PATENTS

| | | | |
|---|---|---|---|
| 2,615,989 | 10/1952 | Thad | 179/100.2 S |
| 3,171,986 | 3/1965 | Bonner | 307/109 |
| 3,356,921 | 12/1967 | Bradford | 318/629 |
| 3,712,973 | 1/1973 | Karl | 179/100.2 S |

*Primary Examiner*—Robert K. Schaefer
*Assistant Examiner*—Thomas Langer
*Attorney, Agent, or Firm*—William K. Serp; John R. Hoffman; John E. Peele, Jr.

[57] ABSTRACT

A control circuit for a motor which drives a card carrying a magnetic recording of an audio presentation. The card additionally carries a speed control signal in the form of a continuous, conductive, control stripe. The presence of the control stripe is sensed by a pair of conductive feelers switching on a transistor which controls the operative speed of the card drive motor. The circuit additionally includes a resistor-capacitor timing circuit which prevents turn-off of the switching transistor in the event of intermittent interruption in the conductive path between the sensors to prevent momentary, undesired changes in the motor speed.

4 Claims, 1 Drawing Figure

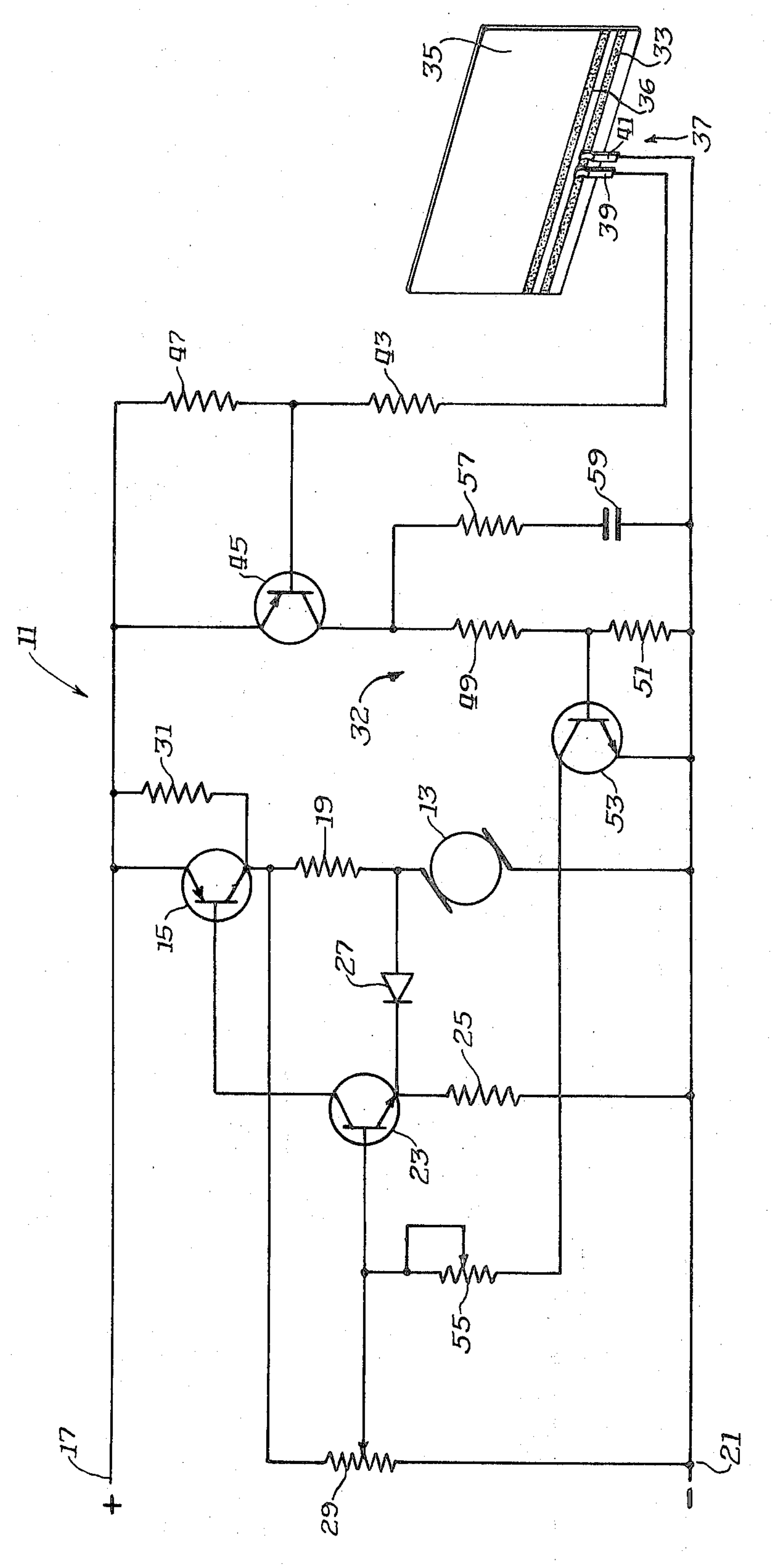

MOTOR CONTROL CIRCUIT FOR DUAL SPEED MAGNETICALLY STRIPED CARDS

BACKGROUND OF THE INVENTION

This invention relates to a control circuit particularly adapted for teaching devices which utilize magnetically striped cards and more particularly relates to a control circuit for controlling the speed of the card drive motor in response to a control signal carried upon the cards.

Various types of teaching machines are known which employ a motor driven feed roller for engaging a rectangular card and for feeding the card through a guide channel across a transducer head at a readout station. Magnetically recorded instructional information is carried upon the card and reproduced to provide the operator with an audio presentation of the recorded information. Additionally, visually readable information may be printed upon the card which corresponds to the audio presentation so as to provide the user with a reinforced learning situation. With respect to prior machines, the information has been recorded upon and reproduced from the cards at a single transport rate generally 2 ¼ inches per second. In the past, this rate has approached a standard in view of technological limitations which results in the fidelity of the sound at lower speeds to be unacceptable, and higher speeds to be unacceptable due to the short length of the audio track available upon such cards. It will be appreciated that if the transport rate of a card can be reduced, the recorded information retained upon the card can be considerably increased. Technological improvements in recent years have enable such speed reductions while maintaining acceptable audio quality. Because of the large number of cards available, which were recorded at the higher rate, it is desirable that any new machines be compatible with the older high-speed as well as with the new low-speed cards. Further, there is considerable possibility that the cards will be intermixed during use; therefore, to allow the greatest versatility, it is convenient if such new machines be capable of distinguishing automatically between the low and the high speed cards thus increasing operator convenience. One such machine, which is adapted to handle cards of intermixed recording speeds on an automatic selective basis, is described in U.S. Patent application Ser. 67,451, filed Aug. 27, 1970, by Fred G. Kral et al. entitled "A Dual-Speed Machine Handling Magnetically Striped Cards and Cards Therefor" and having a common assignee with this application.

As described in the cited application, a rectangular card is provided carrying upon one surface two information stripes. A first magnetic stripe is provided which carries the audio information reproduced during playback with the aid of a transducer head. The low speed card is also provided with a second conductive stripe which is parallel to and continuous with the first stripe. The machine includes a sensor in the form of a pair of switch contacts which are electrically connected by the conductive control stripe. In the presence of the control stripe, the motor driving the card feed roller is switched to a slower speed to facilitate reproduction of the audio signal recorded upon the audio stripe. It will be appreciated that with such an arrangement, the speed of the motor is dependent upon the continuity of the path between the conductive feelers. In order to prevent intermittent switching of the motor between its two speeds, the conductive stripe coating must be continuous. Frequently, this requirement is difficult to meet. During coating, breaks in the path may occur as a result of uncontrollable manufacturing tolerances. Further, during use, the conductivity of the stripe may be broken by rough handling, or the surface may acquire a non-conductive film of dirt and oil thus interfering with the conductive path displayed to the sensor. Prior motor control arrangements responded to such stripe imperfections by intermittently switching the motor speed thus producing annoying changes in the audio presentation.

A main object of this invention is to provide an improved motor control circuit for a teaching device for handling magnetically striped cards which additionally carry a control signal for determining the translational speed of the card.

Other objects and advantages of this invention will become apparent from the following description and drawing in which the single figure is a schematic diagram of a motor control circuit embodying certain features of this invention.

DESCRIPTION OF THE ILLUSTRATED EMBODIMENT

The single FIGURE illustrates a control circuit 11 for a card-drive motor 13. This circuit provides a speed control arrangement for the card drive motor 13 which serves to maintain the rotational speed of the motor constant irrespective of changes in line voltage and loading upon the motor 13 in a manner to be hereinafter further described. The circuit 11 includes a PNP series control transistor 15 which is operated in a linear mode, the emitter of the transistor 15 is connected to a positive supply source terminal 17 and the collector is connected through a low value resistor 19 to one terminal of the motor 13. The remaining terminal of the motor is connected to a negative supply source terminal 21. Serving to control the operating point of the series control transistor 15 is an NPN speed regulating transistor 23 the collector of which is connected to the base of the series control transistor 15 and the emitter of which is connected through an emitter bias resistor 25 to the negative supply terminal 21. Providing a reference voltage for the emitter of the speed regulating transistor 23, is a diode 27. The anode of the diode 27 is connected to the common junction of the resistor 19 and the motor 13 and the cathode of the diode 27 is connected to the emitter of the speed regulating transistor 23 thus completing a negative feedback loop as will be further described. The speed regulating transistor 23 is also operated in a linear mode and serves to set the operating point of the series control transistor 15. Adjustment of the operating point of the speed control transistor 15 is by means of a high-speed variable resistor 29. The wiper of the resistor 29 is connected to the base of the speed regulating transistor 23 and the remaining terminals are connected between the negative supply terminal 21 and the collector of the series control transistor 15. The connection of the high speed resistor 29 to the collector of the series control transistor 15 provides a positive feed-back loop for speed control regulation the operation of which will be subsequently described. A relatively high value resistor 31 is connected between the emitter of the series control transistor 15 and the collector thereof so as to provide sufficient current flow through the base of the speed regulating transistor 23 to assure turn-on.

For purposes of discussion, it will be assumed that the high speed variable resistor 29 has been adjusted for a selected speed range and power applied to the control circuit 11. Upon the application of power, the speed regulating transistor 23 is caused to conduct which in turn causes the series motor control transistor 15 to conduct providing current flow through the motor 13. The motor 13 reaches its operating speed. In the event the power supply voltage increases, the fluctuation is sensed as an increase in voltage across the motor 13 which in turn is coupled through the diode 27 to the emitter of the speed regulating transistor 23. This voltage increase at the emitter of the transistor 23 causes it to reverse bias thus decreasing conduction and in turn decreasing conduction through the series control transistor 15 so as to reduce the current flow through the motor 13. In this manner, the motor speed is maintained constant even though the power supply voltage rises. Conversely, should the supply voltage decrease, the circuit will compensate for such change so as to maintain a constant motor speed in a same manner as previously described.

Additionally, the illustrated circuit provides a means for compensating for load variations upon the motor 13 so as to maintain a constant speed within wide swings in motor torque. Assuming that the motor torque has increased producing a current increase through the motor 13, this increased current raises the voltage at the collector of the series control transistor 15. This decrease in the impedence of the control transistor 15 increases the power supplied to the motor thereby supplying the increases torque requirements to maintain constant motor speed. It will be appreciated by those skilled in the art that the value of the resistor 19 is selected with reference to the particular characteristics of the motor used so as to result in constant speed over a wide range of supply voltage and motor torque variations.

The motor control circuit additionally includes a switching means 32 responsive to a conductive control stripe 33 carried upon a card 35. The card 35 additionally carries an audio stripe 36 oriented parallel to and continuous with the control stripe 33. The stripe 33 serves to switch the motor speed from the high speed previously described to a slower speed. The conductive control stripe 33 is sensed by a sensing means 37 in the illustrated form of a pair of fingers 39 and 41 which ride along the card 35 and, in the presence of the conductive stripe, complete a circuit. One of the fingers 41 is connected to the negative supply terminal 21 and the remaining finger 39 is connected through a current limiting resistor 43 to the base of a PNP control stripe sensing transistor 45. The sensing transistor 45 is operative in a switching mode. The emitter of the transistor 45 is connected to the positive supply terminal 17 and the base is connected to the positive supply terminal 17 by means of a biasing resistor 47 which serves to bias the sensing transistor 45 to cut-off in the absence of a conductive stripe upon the card 35. When a conductive path is introduced between the fingers 39 and 41 of the sensing means 37, the sensing transistor 45 is switched "on" thereby causing current to flow through the emitter-collector junction and through a pair of biasing resistors 49 and 51 which are connected between the collector of the transistor 45 and the negative supply terminal 21. Upon sensing of the magnetic stripe 33 a signal is applied to the base of an NPN slow speed switching transistor 53 the emitter of which is connected to the negative supply terminal 21 and the collector of which is connected through a slow speed adjustable resistor 55 to the base of the speed regulating transistor 23. Thus, in response to the presence of the conductive stripe upon the card, the slow speed switching transistor 53 is caused to conduct bringing one terminal of the slow speed variable resistor 55 to ground effectively connecting it between the base of the speed regulating transistor 23 and the negative supply terminal 21. In this manner, the speed setting of the motor regulating portion of the circuit is adjusted to a lower motor speed. Serving to prevent instantaneous abrupt breaks in the conduction of the control stripe is an RC time constant network including a resistor 57 in series with a capacitor 59. The resistor 57 in series with the capacitor 59 creates a charge time-constant for the capacitor 59 and is selected to provide a relatively fast charging period. A discharge time-constant is provided by the resistor 49 and the resistor 51 in parallel with the emitter-base junction of the transistor 53 which are in series with the resistor 57 across the capacitor 59. The discharge time-constant is selected to be relatively slow in comparison with the charging time-constant. Thus, in response to the presence of the conductive stripe 33 upon the card the capacitor 59 will be quickly charged, thereby allowing the slow speed switching transistor 53 to conduct, which results in the reduction of the speed of the card drive motor 13. In the event the continuity between the sensing fingers 39 and 41 is momentarily interrupted, as the result of an imperfect coating of the conductive stripe 33 or as a result of dirt or oil being deposited on the card, the capacitor 59 will discharge through the series resistive network 49, 57 and 51 in parallel with the base emitter junction of the transistor 53. This discharge maintains the slow speed switching transistor 53 in conduction irrespective of the operative condition of the control stripe sensing transistor 45. Upon resumption of continuity between the sensing fingers 39 and 41, the capacitor 59 will again charge. It will be appreciated that in this manner imperfections in the continuity between the sensing fingers 39 and 41 is ignored and the motor speed maintained at the desired slow rate.

In operation, the circuit is preset. The high speed resistor is adjusted so that the motor will drive a card at the desired rate to provide fidelity for the recording upon the track which has been previously recorded at a high speed. The sensing fingers 39 and 41 are then shorted to turn "on" the slow speed switching transistor 53. The slow speed variable resistor 55 is adjusted so that the motor 13 drives the card 35 at the slow speed to provide adequate fidelity. After adjustment, the operator is permitted to intermix cards having various recording speeds. Those cards recorded at a higher speed will not carry a conductive control stripe. In the absence of a conductive stripe, the slow speed switching transistor 53 is switched "off," effectively removing the slow speed adjusting resistor 55 from the circuit 11. In the presence of a card upon which a slow speed recording has been made, the conductive fingers 39 and 41 of the sensing means 37 are presented a conductive path which will cause the conductive stripe sensing transistor 45 to be switched "on" in turn charging the capacitor 59 and switching on the slow speed switching transistor 53. In this manner, one terminal of the slow speed adjusting resistor 55 is effectively grounded. Thus, the motor 13 will operate at the preset slow speed. In the event that continuity between the sensing fingers 39 and 41 is momentarily interrupted, the sensing transistor 45 will be momentarily turned "off," however, due to the charge upon the capacitor 59 discharging through the series resistive network 49, 57 and 51 in parallel with the base emitter junction of the transistor 53, the slow speed switching transistor 53 will be maintained in its conductive state so that the circuit effectively ignores any momentary interruptions in the continuity of the conductive stripe 33.

While this invention has been particularly shown and described in connection with a preferred embodiment, it will be understood that various changes in form and detail may be made without departing from the spirit and scope of the invention as set forth in the following claims:

What is claimed is:

1. An audio card system comprising:

A plurality of cards having magnetic media carried thereon for being transduced at one of a selected plurality of predetermined speeds, and code means disposed thereon representative of the correct speed at which the magnetic media is to be transduced; and an audio reproducing machine for transducing audio information from the magnetic media of a card at the correct reproducing speed, said reproducing machine having transducing means, card transporting means for transporting said cards along a card guide path of travel past the transducing means, an electric motor for driving said transporting means, speed regulating means for providing a continuous speed control signal to the motor so that the motor will operate at a substantially constant speed, whereby said cards will travel at said transducing means at a constant speed, electrical control means connected to said motor for operating said motor at one of a selected plurality of predetermined speeds, said control means including switching means changeable from a normally "off" state to an "on" state in response to said code sensing signal for changing the speed control signal thereby switching the motor speed to another constant selected value, code sensing means at the guide path for generating a code sensing signal upon sensing the code means on a card and actuating said control means in response thereto, and means for preventing unintentional interruptions in said code sensing signal from turning the switching means "off."

2. The card system of claim 1 wherein said interruption preventing means comprises timing means for providing a simulated code sensing signal for a predetermined time after the first mentioned code sensing has been interrupted, whereby the switching means remains in an "on" state.

3. The card system of claim 2 wherein said code means is in the form of a continuous conductive stripe, said code sensing means is in the form of a pair of spaced apart conductive members positioned for contacting relation with the conductive stripe, said switching means includes a switching transistor connected to one of said conductive members and to said speed regulating means, said switching transistor being turned "on" in response to a conductive path formed between said members, and said timing means including a parallel resistance-capacitance network connected to the base of said switching transistor, whereby the switching transistor remains in an "on" state despite an interruption in the code sensing signal caused by a momentary interruption in the conductive path between the conductive members.

4. The card system of claim 3 wherein said switching means further includes a sensing transistor coupled to the base of the switching transistor and to one of said conductive members, whereby said sensing transistor serves to turn the switching transistor "on" in the presence of the code sensing signal generated as a result of the presence of a conductive path between the conductive members.

* * * * *